United States Patent
Buske et al.

[11] Patent Number: 5,957,298
[45] Date of Patent: Sep. 28, 1999

[54] PROCESS AND DEVICE FOR SEPARATING NON-MAGNETIC MATERIALS AND OBJECTS BY USING FERROHYDRODYNAMIC FLUID

[75] Inventors: Norbert Buske; Dirk Günther; Hendrik E. Böhme; Karsten Thiessen, all of Berlin, Germany

[73] Assignee: Polychemie GmbH Velten, Germany

[21] Appl. No.: 08/591,668

[22] PCT Filed: Jul. 21, 1994

[86] PCT No.: PCT/EP94/02404

§ 371 Date: May 3, 1996

§ 102(e) Date: May 3, 1996

[87] PCT Pub. No.: WO95/03128

PCT Pub. Date: Feb. 2, 1995

[30] Foreign Application Priority Data

| Jul. 23, 1993 | [DE] | Germany | 43 25 386 |
| Aug. 16, 1993 | [DE] | Germany | 43 27 826 |
| Mar. 4, 1994 | [DE] | Germany | 44 07 864 |
| Jun. 30, 1994 | [DE] | Germany | 44 23 777 |

[51] Int. Cl.$^6$ ........................ B03C 1/30
[52] U.S. Cl. ............ 209/39; 209/214; 209/227; 209/232
[58] Field of Search ............ 209/39, 213, 214, 209/225, 226, 227, 228, 231, 232

[56] References Cited

U.S. PATENT DOCUMENTS

| 3,788,465 | 1/1974 | Reimers | 209/214 X |
| 4,094,804 | 6/1978 | Schimoiizaka | 252/62.52 |
| 4,270,447 | 6/1981 | Gregorovic | 209/39 X |
| 4,830,188 | 5/1989 | Hannigan et al. | 209/172.5 X |
| 4,921,597 | 5/1990 | Lurie | 209/39 X |
| 5,340,472 | 8/1994 | Heck | 209/39 X |

FOREIGN PATENT DOCUMENTS

| 3709852 | 10/1988 | Germany . | |
| 1437088 | 11/1988 | U.S.S.R. | 209/39 |

OTHER PUBLICATIONS

R.von Dilip Kumar; Magnetitregenerierung in indiscen Kohlenaufbereitungsanlagen; Bertling und Baer: Weiterentwicklung von Verfahren zue Kokstrockenklüng, Glückauf 119 (1983) Nr. 13; pp. 636–639.

Agst von Joachim and Moers U. Agst; Fünfte Duisburger Recycling–Tage; Informationsschrift 42, Thyssen Sonnenberg, pp. 110–113.

U.Andres; Trennung von Nlchteisenmetall–Schrott (Separation of Non–Ferrous Scrap Metals) Aufbereitungs–Technik 35 (1994) Nr. 2, pp. 71–78.

*Primary Examiner*—Tuan N. Nguyen
*Attorney, Agent, or Firm*—Londa and Traub LLP

[57] ABSTRACT

The invention describes a process and an appliance for separating non-magnetic materials and objects with the use of magnetic fluids. With this invention a restoration of the magnetic fluid adhering to the separated material is made possible, by removing the magnetic liquid still adhering to the separated product both through magnets as well as through water. The magnetic fluid in the separating chambers is constantly monitored as regards volume and concentration via a monitoring installation. An appropriate area of use for the invention is the separation of fragmented materials, the separation of capacitors in capacitators containing polychlorinated biphenylenes (PCB) and PCB-free capacitors. The invention described, moreover, the composition, manufacture and use of environment-friendly diluted magneto-fluids, which can be especially suitable in employment in the separation of non-magnetic materials using the sink-float process in the magnetic field gradient.

16 Claims, 5 Drawing Sheets

PROCESS AND DEVICE FOR SEPARATING NON-MAGNETIC MATERIALS AND OBJECTS BY USING FERROHYDRODYNAMIC FLUID

BACKGROUND OF THE INVENTION

1. Field of the Invention

The invention concerns a process and an installation for separating non-magnetic materials and objects with the use of magnetic fluids subject to a magnetic field, according to the principle of sink-float separation in one or more separation chambers. The materials or objects which are to be separated are of varying densities, and according to this difference in density are subject to varying forces.

The invention furthermore concerns the composition, manufacture and use of environmental-friendly diluted magnetofluids, where magnetic iron oxide particles, mainly consisting of magnetite, are, through a monomolecular fatty acid layer and through a second layer of alcoxylated fatty alcohols and end-group sealed alcoxylated fatty alcohols or by sugar surfactants, protected against agglomeration and colloidally dispersed in water. Through the addition of water-soluble substances, which are capable of creating extra hydration effects, the sedimentation stability can be improved.

The invention is especially applicable for separating substances of various materials or objects, for ample during the recycling of electronic scrap or automobile scrap, during ore or coal processing or similar separation processes. The environment-friendly diluted magneto-fluids are especially suitable for the sink-float separation of non-magnetic substances, but also as calibration fluids for magnetic measuring instruments, as sealing fluids for hermeticaly sealing rotary appliances, as lubricants and as marking substances in agriculture and forestry for the analysis of soil erosion, as well as for use in medicine.

The principle of the sink-float separation of non-magnetic materials in magnetic fluids in the magnetic field gradient has long been familiar. However, until now the feasibility of this process has foundered on the magnetic fluids available, their insufficient attributes, the processing costs, and on the lack of interest in disposal and recycling problems.

2. Description of Related Art including information disclosed under 37 CFR 1.97–1.99.

DE 3124276 C2 describes a process and installation for separating non-magnetic solid materials of varying density, which are suspended in a magnetic fluid and are conveyed in the fluid through a separation zone with a gap tapering into a V-shape, in which magnetic lifting forces, different from the adjacent areas, are at work. The magnetic field is created by a set of magnets, which under formation of the V-shape are placed with their pole surfaces opposite each other. By means of this solution non-magnetic materials can be classified without size limitation, by conveying the material crosswise to the lengthwise direction of the obliquely downward sloping and tipped V-gap at the upper end of the separation zone, and by separating the material components of higher density in the area of the V-gap; meanwhile the material components of lower density are suspended and conveyed above the V-gap into the lower area of the sloping separation zones.

U.S. Pat. No. 4,521,303 describes a process for separating a mixture of carbon and other solid components by means of magnetic fluids through a described circulation regime.

Concrete installations for substance separation by means of magnetic fluids, or improvements of the single components of such installations have been described, for instance, in the following publications: DE U.S. 2509959 and DE 3324536 C2 structure of the magnetic poles); DE 3321102 C2 (structure of the separation cell) and U.S. Pat. No. 4,113,608 (inletting and outletting of the product to be separated).

The disadvantage of all the familiar solutions is that a recovery of discharged magnetic fluid and a constant maintenance of the concentration and volume of the magnetic fluid in the separation cell is not possible or not accounted for. There is the further disadvantage that the separation is limited to fragmented materials.

Through the development of innovative magnetic fluids the prerequisites for a major technical deployment of the sink-float separation process by means of magnetic fluids have been improved.

Magneto-fluids are dispersions of small magnetic particles in optional carrying fluids. The carrying fluids are chosen according to the purpose of the magneto-fluids. In order to maintain stable magneto-fluids, the magnetic particles must be colloidally dispersed in the carrying fluid. An agglomeration of these particles is frequently prevented through one or more adsorption layers of surface-active substances; their type is again determined by the carrying fluid and the demands put on the magneto-fluid.

The magnetic characteristics of these superparamagnetic fluids depend on the type, size and concentration of the magnetic particles. All other characteristics are determined by the carrying fluid, the surface-active substances, and solubilizers, which may have to be added to improve solubility and stability.

From DD 292 825 A7, for example, a magnetic fluid is known to exist, which is produced on a mineral oil base and can be especially applicable for the sealing of rotary appliances, for magneto-fluid storage and for the damping of oscillation coils.

A process of manufacturing a ferro-fluid on oil, ester, or ether base, is described in DE 33 12 565 C2.

Furthermore, there are numerous formulations encountered in the literature on patents concerning diluted magneto-fluids, where the magnetite particles have been stablised mostly through a monomolecular adsorption layers consisting of one or more fatty acids and a second layer of one or more anionic, cationic, amphoteric or non-ionic surfactant. For instance, the following substances were used as a second layer: fatty acids (U.S. Pat. No. 4,208,294), sulphone acids or sulphates (U.S. Pat. No. 4,094,804, U.S. Pat. No. 4,855,079). All the variants have the disadvantage that no magneto-fluids are produced that are neutral or stable, or not easily soluble, in a neutral ambience. As regards the use of cationic or amphoteric surfactants, this equally applies on principle, or the chemical compounds are based on those which are not completely harmless ecologically, or even toxologically speaking (U.S. Pat. No. 4,493,778; DE 37 09 852 A1).

DE 37 09 852 A1 describes stable magnetic fluid compounds with characteristics such as the capability of conducting electricity, ion exchange capacity, and anti-microbial effetivity. There are, however, only few concrete, feasible examples cited, and these do not purport the manufacture of diluted magneto-fluids. With some of these surfactant classes, as is also described in U.S. Pat. No. 4,938,886, there are indeed some more or less easily biologically degradeable, non-toxic and neutrally soluble diluted magneto-fluids that can be manufactured; however, these special surfactants, not available commercially, have to be synthesised in an expensive and elaborate process. For the manufacture of larger amounts of magneto-fluids, which, for example, are necessary for separation apparatus using the sink-float process with about 1 tonne of scrap throughput per hour, such special surfactants are financially out of the question. An economically more viable variant is described in DE 41 30 268 A1. However, one falls back here on alkylarylpolyetherglycins, which are not completely without their problems of ecological feasibility. Apart from which, the adsorbed monolayer is made of carboxyl-functionalised polymers, which are not easily, biologically degradeable.

SUMMARY OF THE INVENTION

The invention derives from the task of creating a process and installation for separating non-magnetic materials and objects with varying components and substances in a casing, with the use of magnetic fluids in subject to a magnetic field, following the principle of sink-float separation. With this, an economical and effective separation of non-magnetic materials and objects is made possible even in the medium- and high-density levels, and negative environmental effects are avoided to a large degree. Another purpose of the invention is to create new stable magnetic fluids, which are economically viable in production and which are easy to recycle, to dispose of, and biologically degrade; as well as the need to create economic procedures for the manufacture of these magnetic fluids, and new options for their use.

The special virtue of the invention lies in the fact that magnetic fluids on a diluted carrying fluid base are feasible in application and these magnetic fluids, which are partially discharged from the separation cell with the separated product, can be restored and re-used. This is made possible by constant monitoring of the magnetic fluid as regards volume and concentration in the separation chambers via monitoring appliances, by maintaining volume and concentration as constant as possible through re-dosage. The magnetic fluid which has been discharged from the separation chamber with the separated product is separated in a first stage though magnetic force, and in further stages is removed through rinsing; the separated concentrated magnetic fluid and/or the released diluted magnetic fluid is re-conveyed into the separation chamber via re-dosage appliances. In this way the separated concentrated magnetic fluid can be directly conveyed via re-dosage appliances, and the released diluted magnetic fluid can be conveyed into the separating chambers and/or the storage receptacle either directly via re-dosage appliances or indirectly via intermediate operation of the manufacturing process of new, concentrated magnetic fluid. It is equally possible to convey water via re-dosage appliances, in order to counteract natural evaporation. Through operation of the re-dosage appliances via signals from the monitoring installation it is guaranteed that amount and concentration of the magnetic fluid situated in the separating chambers is maintained constant within adjustable tolerance limits.

In order to guarantee exact measuring through the monitoring installation, the magnetic fluid in the separating chambers is constantly or periodically circulated and/or mixed.

A further advantage of the invention consists in the continuous operational regime, whereby the conveying of the product takes place continuously through vibration and the conveyance into the separating cell is possible both on the surface of the magnetic fluid as well as in the volume of the magnetic fluid. For substance conveyance within the separating cell there is exploitation of magnetic fluid surface deflexion and gravity.

The sensor for monitoring the magnetic fluid volume is preferably placed inside the separating cell The sensor for monitoring the concentration of the magnetic fluid can be placed inside or outside the separating cell and be adapted as magnetic polarimeter for measuring susceptibility. The sensors trigger dosage pumps and/or electrovalves.

A further advantage of the invention consists in the fact that the separation of the magnetic fluid adhering to the separated material takes place in a first stage via magnets, and is completed in further stages through rinsing with water. The magnetic separation of the concentrated fluid is achieved here by means of a drum with magnets placed within, which is integrated into the outlet route. The rinsing by water of the remaining magnetic fluid still adhering to the separated product after magnetic separation occurs directly on the outlet route in such a way that the rinsing water flows in reverse current to the transported separated product and is drained off via a lower level of the outlet route.

As regards electronic scrap processing, separation processes have to be applied several times before the actual recycling process, since, depending on the construction or compounding of the components, different recycling processes are employed, or varying Intermediate or final storage regulations or disposal procedures have to be taken into account.

With capacitors, for example, a certain problem arises in that during disposal capacitors containing polychlorinated biphenyline (PCB) as well as those that are PCB-free occur. A selection or identification according to type descriptions or other markings is only restrictedly possible and does not present the necessary security during selection.

A further virtue of the invention also consists in the fact that, in contrast to the familiar technical solutions with which only processed and as a rule fragmented materials can be separated, now complete objects made of non-magnetic substances, which wholly or partially have casings fled with components out of varying materials and/or varying chemical substances or substance mixtures, can be separated as well. To achieve this the objects are introduced into a magnetic fluid situated in the magnetic field gradient; the objects with the same density of casing material, componental material, and substances or substance mixtures are directed out at a defined, uniform position in the magnetic fluid, and the objects with varying density of casing material, and/or componental material and/or substances or substance mixtures are directed out at defined, varying positions in the magnetic fluid.

Through the use of magnetic fluids for the separating of capacitors in a first batch of capacitors with PCB-free electrolytes and in a second batch of capacitors with electrolytes containing PCW it is possible, for instance, to make effective and enviromentally relevant decisions as regards recycling, or the disposal of these components. This aspect acquires, for instance, a special significance in Germany, for polychlorinated biphenyline had been employed in Germany as a dielectric in capacitors from the early fifties until quite recently. PCBs are difficult to degrade and in unfavorable circumstances in the case of fire can form polychlorinated dibenzofurans and dibenzodioxines. Capacitors containing PCB can be found, amongst others, in the following groups of appliances: fluorescent lamps, motors of various electrical domestic appliances, such as washing machines, kitchen range ventilation hoods, dishwashers, etc., water heating circulating pumps, oil burners, office machines and appliances. In Germany, capacitors containing PCB are subject to regulations applying to waste requiring especial supervision and control and must be disposed of in underground depots.

A further advantage of the invention consists in the fact that with the installation for separating objects made of non-magnetic materials, which have a casement wholly or partially filled with components out of varying materials and/or varying chemical substances or substance mixtures, a great number of objects can be effectively separated in the following way. In a separating vessel, which is wholly or partially filled with a magnetic fluid, at least two conveyor belts are placed on different levels. A realisation variant which is simple and economical to manufacture consists in placing the conveyor belts orthoganally to one another, whereby the first conveyor belt is immersed deep into the magnetic fluid and transports objects of high density, and a second conveyor belt runs above the first conveyor belt and conveys objects of lower density. With a precise adjustment of the separation parameter it is possible to run the first conveyor belt on the bottom of the separation vessel and the second conveyor belt on the surface of the magnetic fluid.

An economically efficient procedural development is guaranteed in that the magnetic fluid carried out by adhering to the objects is restored by being separated through magnetic force and/or being rinsed off and so restored. This is realised in application in such a way that underneath the outlet sides of the conveyor belts interceptors are placed to catch the separated objects, whereby the interceptors and/or the conveyor belts have on their outsides preparations conducive to magnetic precipitation and/or the rinsing off of the magnetic fluid still adhering to the objects.

A further advantage of the invention as regards the magnetic fluids lies in the fact that through the use of sugar surfactants, which are made entirely of naturally growing raw materials, in combination with the diluted caring fluid and the harmless iron oxide particles, environment-friendly magneto-fluids are being created which correspond to the latest ecological demands and give access to further options of their use, also in the field of medicine.

Through the attributes of the magneto-fluids they can be used safely in medicine, for example as carrying or conveyor substances for active ingredients and/or as marking substances.

A further advantage of the invention results from the addition of easily water-soluble polyhydrolic alcohols, through which stability and solubility behaviour is improved.

The stabilising of the iron oxide particles through a first and a second adsorption layer, whereby the latter is formed from alcoxylated fatty alcohols with an 8–18 C-atom alkyl chain and 4–20 alcoxylate units, results in a high concentration of the magnetic particles and with this a high saturation magnetisation. Through this buoyancy effects are also achieved in heavy materials such as copper or tin, for example. Through a pH-neutral adjustment of the magnetic fluids there is no reaction with the product which is to be separated, resulting in favourable conditions for transport, storage and protection of the work force. The magnetic fluids are highly stable, also under electrolyte loading, and are easily soluble in water. This is especially important in case of pH fluctuations, which may ensue through the separated product or through the direct entry of electrolytes, especially in the processing of batteries, accumulators, or etched metals. A high operational capacity leads both to water-saving during the rinsing process, as well as to the formation of highly concentrated solutions of rinsed-off solutions. A low adsorption capacity of the magnetic fluid on the separated product combats disturbances of balance between the surfactant combined as the second adsorption layer and the dissolved surfactant in the carrying fluid. A minor tendency to foam guarantees the smooth operation of a fast-moving mechanism, as well as problem-free and continual measurement or regulation of level, density and viscosity in the installation. The low viscosity has a positive influence on the operational capacity. The magnetic fluids' stability, even when diluted, results in a high recycling capacity of the diluted, rinsed-off fluid.

BRIEF DESCRIPTION OF THE DRAWINGS

The invention is explained in more detail with the aid of examples executed in the figures below.

DESCRIPTION OF THE PREFERRED EMBODIMENTS

Figure 1:
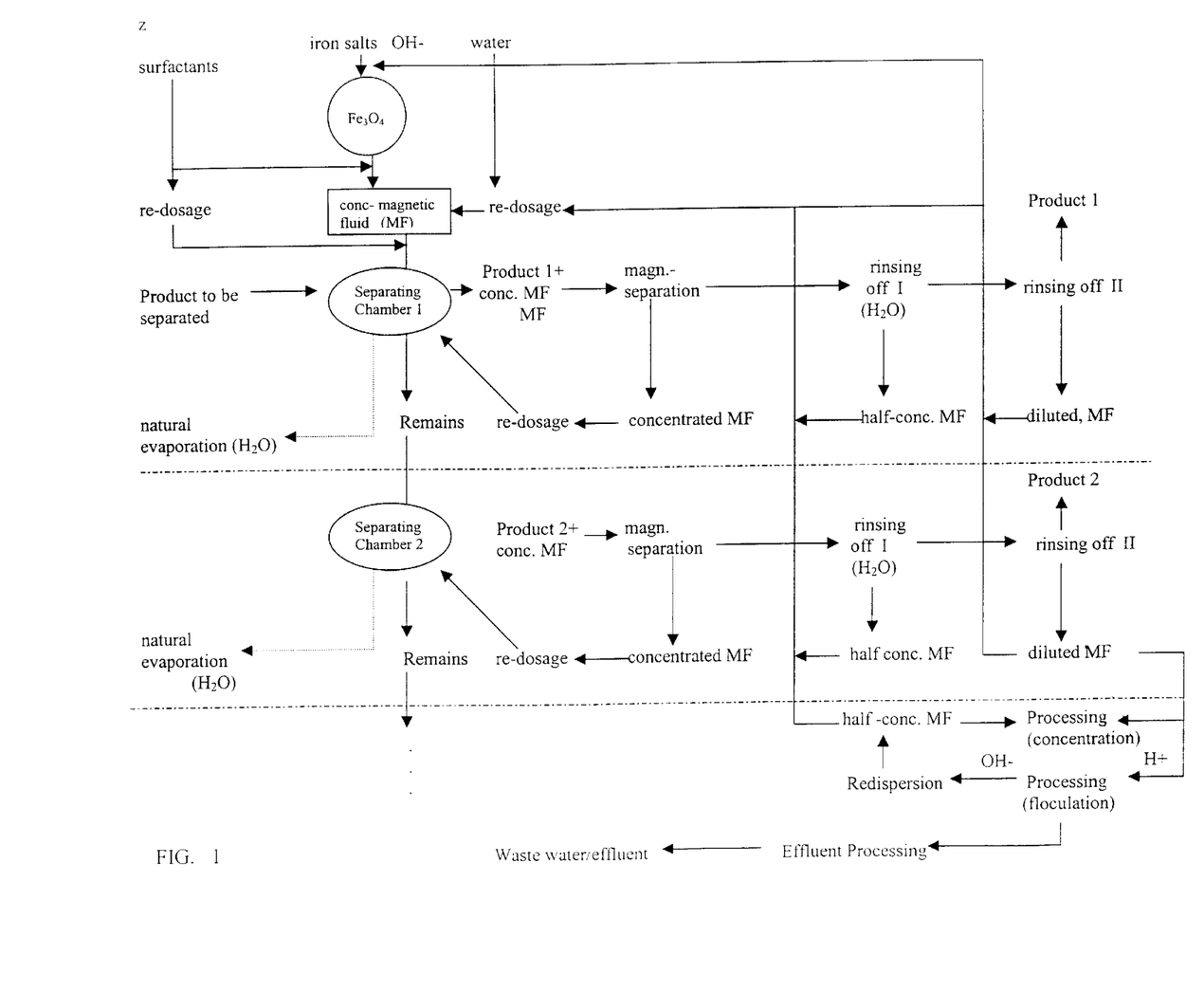
FIG. 1 A procedural diagramme showing the sink-Boat separation in magnetic fluids.

As demonstrated in FIG. 1, the product to be separated arrives at a separating chamber 1. After the conclusion of this separation process the product, on which there still adheres some concentrated magnetic fluid, as well as remnants of the product to be separated, emerges from the separating chamber 1, which is conveyed to a further separating chamber 2. The concentrated magnetic fluid adhering to the product is now separated magnetically and the concentrated magnetic fluid thus separated is again conveyed to the separating chamber 1 and/or the storage receptacle 2 via re-dosage appliances. A water-rinsing process follows the magnetic separation, which results in a half-concentrated magnetic fluid. One or more further rinsing procedures provide a diluted magnetic fluid. The half-concentrated magnetic fluid can be conveyed directly to the separating chamber 1 via re-dosage appliances or, as in the procedural diagramme in FIG. 1, be transferred to intermediate storage in a storage receptacle 2. The diluted magnetic fluid can, likewise, either be directly uses for re-dosage, or be conveyed in place of water to the manufacturing process of new, concentrated magnetic fluid. Additional to the re-dosage with concentrated magnetic fluid or half-concentrated magnetic fluid it is also possible to provide re-dosage with diluted magnetic fluid, with water, or with surface-active substances. The water ensuing at the end of the rinsing process is subject to processing, for instance flocculation, and re-dispersion; the remaining water is conveyed via effluent processing into the sewage system. The re-dosage appliances are controlled by the sensors 4$a$ and 4$b$, whereby the conveyance of the substances to be re-dosed occurs via the dosing pumps 5$b$ and/or electrovalves 5$a$.

Figure 2:
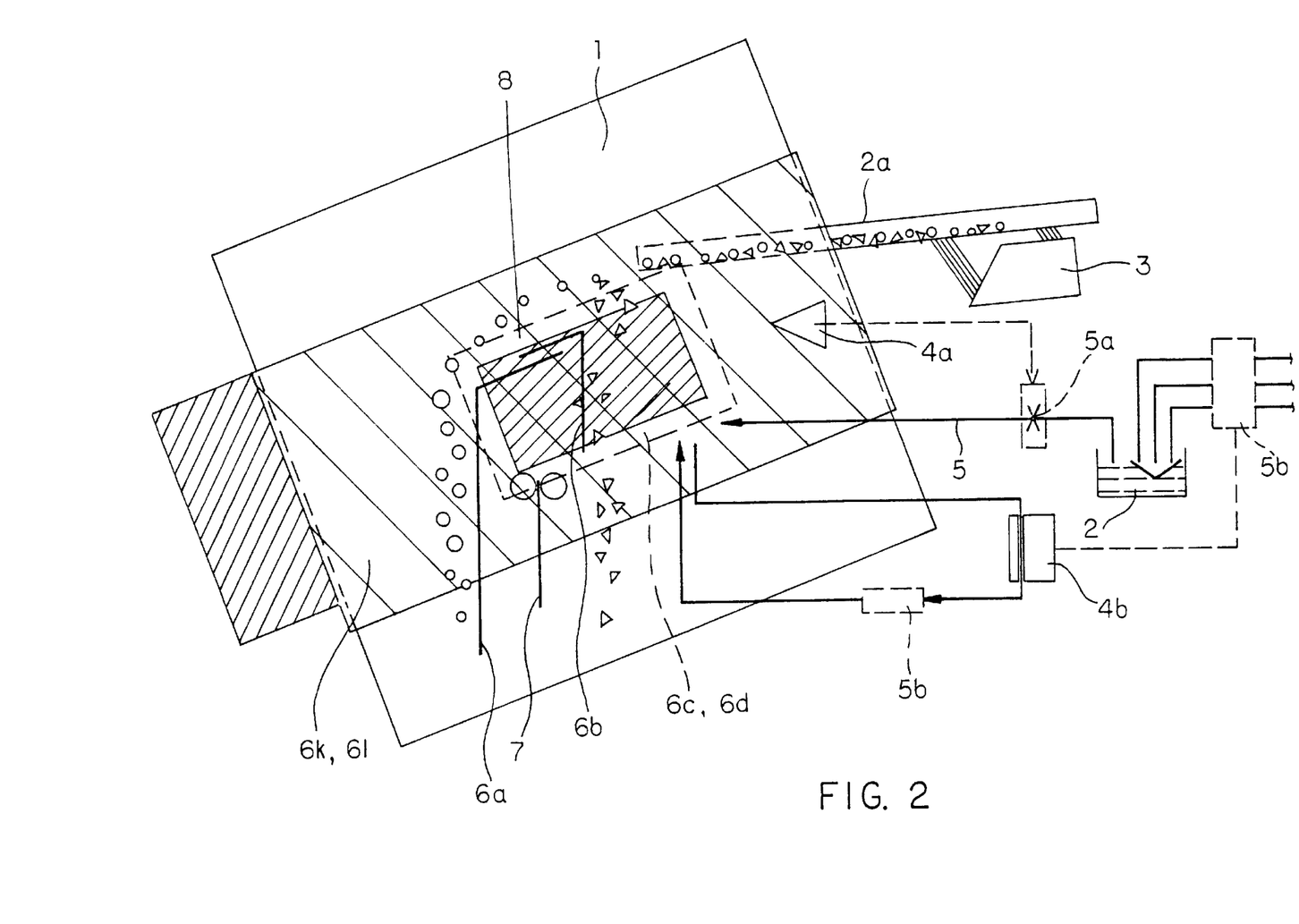
FIG. 2 A diagammatic drawing of a separating cell, side view.
Figure 3:
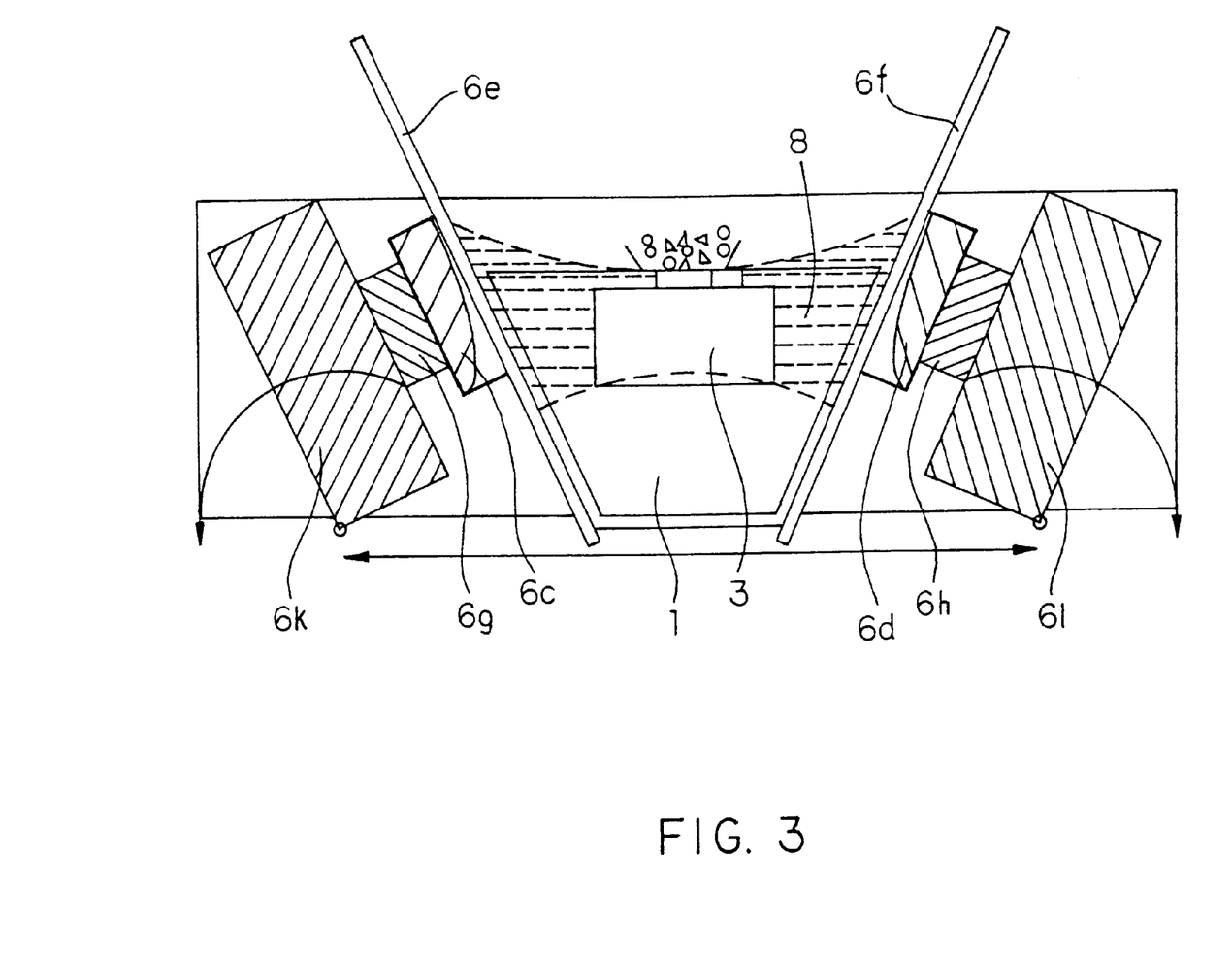
FIG. 3 A diagrammatic drawing of a separating cell, front view

FIGS. 2 and 3 show in a diagrammatic drawing the actual separating cell. The product to be separated is conveyed to the separating cell 1 via a conveying installation 2$a$. In the model demonstrated here the conveyance occurs on the surface of the magnetic fluid 8. It is, however, just as possible to place the conveyance into the interior of the magnetic fluid. The separating cell 1 contains sensors 4$a$ and 4$b$ for monitoring the volume and the concentration of the magnetic fluid 8. In the model shown here sensor 4$a$ is placed inside and sensor 4b outside the separating cell 1, and the magnetic fluid 8 is conveyed in a circuit via a pump 5b to sensor 4b. Furthermore the separating cell 1 receives at least one fluid conveyance 5 for re-dosage of the magnetic fluid. The fluid conveyance takes place independently through magnetic attraction during the opening of the electrovalve 5a.

The material conveyance installation 2a is endowed with a vibroconveyor 3. Through the vibroconveyor 3 a continuous conveyance of the material to be separated is guaranteed. The separating cell 1 has adjustable recoiling sheets 6a, 6b, which can be set for optimal efficiency in the separating process. Moreover, the magnets 6g, 6h, or the pole shoes 6c, 6d of the magnets 6g, 6h, or the sheets 6e, 6f placed on the pole shoes 6c, 6d, and the soft iron 6k, 6l are adjustable in their angles. Furthermore the separating cell 1 has a mixing appliance 7, which, in the model shown, is constructed as a mechanical stirrer. It is, however, just as feasible to construct the mixing appliance 7, for example, as an ultrasonic disperser. The sensor 4b for monitoring the concentration of the magnetic fluid has at least one magnetic polarimeter, which measures the susceptibility. The volume is maintained constant through compensation of the loss of volume, which is controlled via a sensor 4a.

Figure 4:
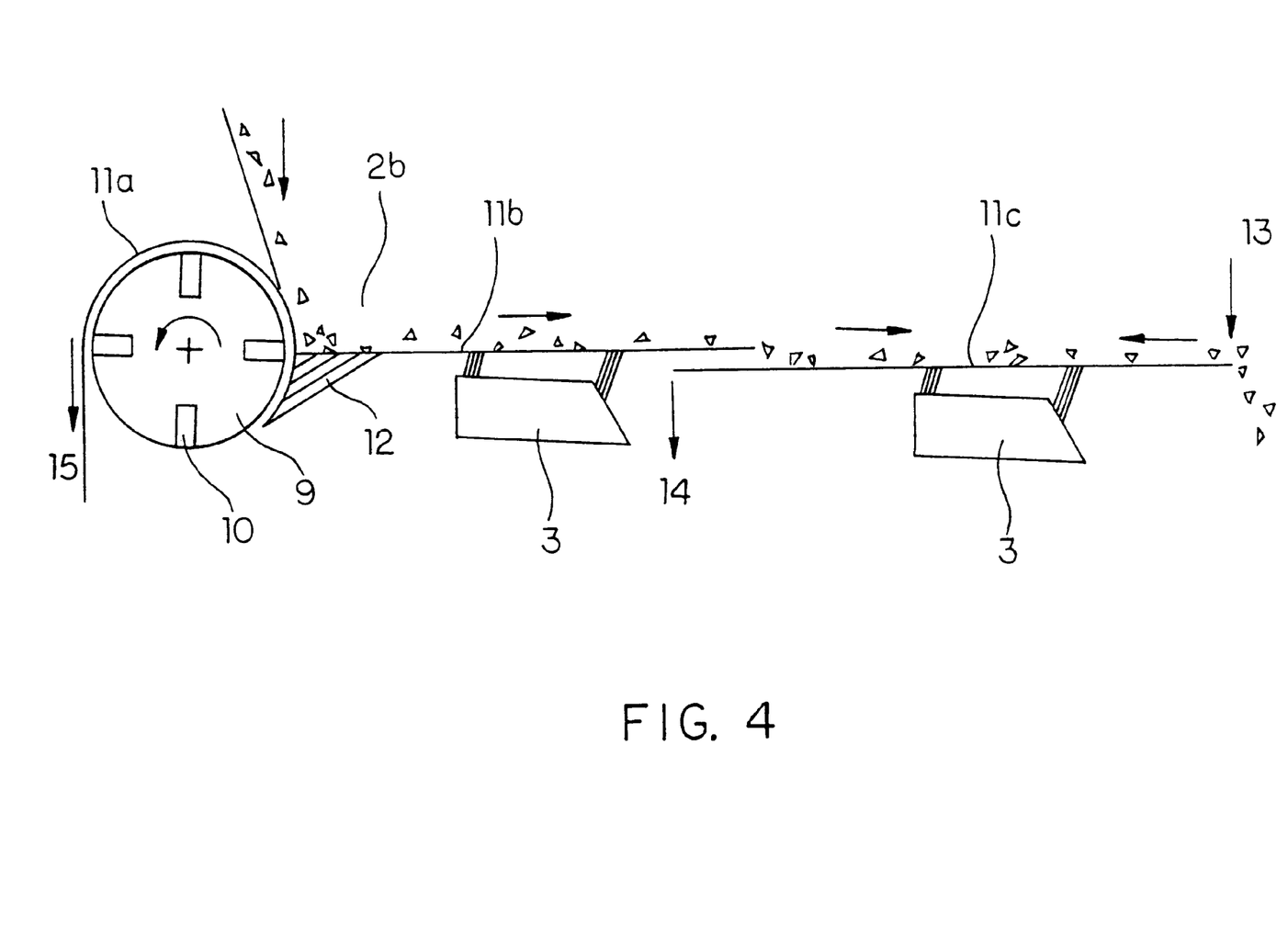
FIG. 4 A diagrammatic drawing of the outlet conveyance installation for the separation of the magnetic fluid.

The separation of the magnetic fluid from the separated product is represented in FIG. 4. The outlet conveyance installation 2b has, in the model shown, a drum 9, with permanent magnets 10 inside it. The drum 9 rotates under the part of the outlet conveyance route 11a in the opposite direction to the current of the conveyed separated product. At the same time the concentrated magnetic fluid still adhering to the separated product is taken by the magnet 10, placed in the drum 9, and released at the drain outlet 15. In the transitional area of the outlet conveyance route 11a and 11b there is a soft iron component 12. The separated material, freed of a part of the adhering concentrated magnetic fluid is now conveyed along the outlet route 11b by means of the vibroconveyor 3 and reaches the outlet route 11c. Here it is washed with water, conveyed via a water inflow 13, in the reverse current. The diluted magnetic fluid is drained off via an outlet drain 14. The outlet route 11b, 11c slopes upwards and runs on several levels, so that the water flows off according to its natural fall.

The magnets in the model shown are generally constructed as permanent magnets. In addition, however, it is just as feasible to use electromagnets. A further modification of the separation of the magnetic fluid is made possible by placing pulse-timed electromagnets along the outlet route, instead of a drum with permanent magnets.

The following model describes the separation of capacitors.

Capacitors from various household appliances are separated into two groups, namely those containing PCB and PCB-free capacitors. The capacitors consist of an aluminium casing and contain aluminium foil and electrolyte material, which can possibly contain PCB. As magnetic fluids, environment-friendly diluted magneto-fluids are employed.

Figure 5:
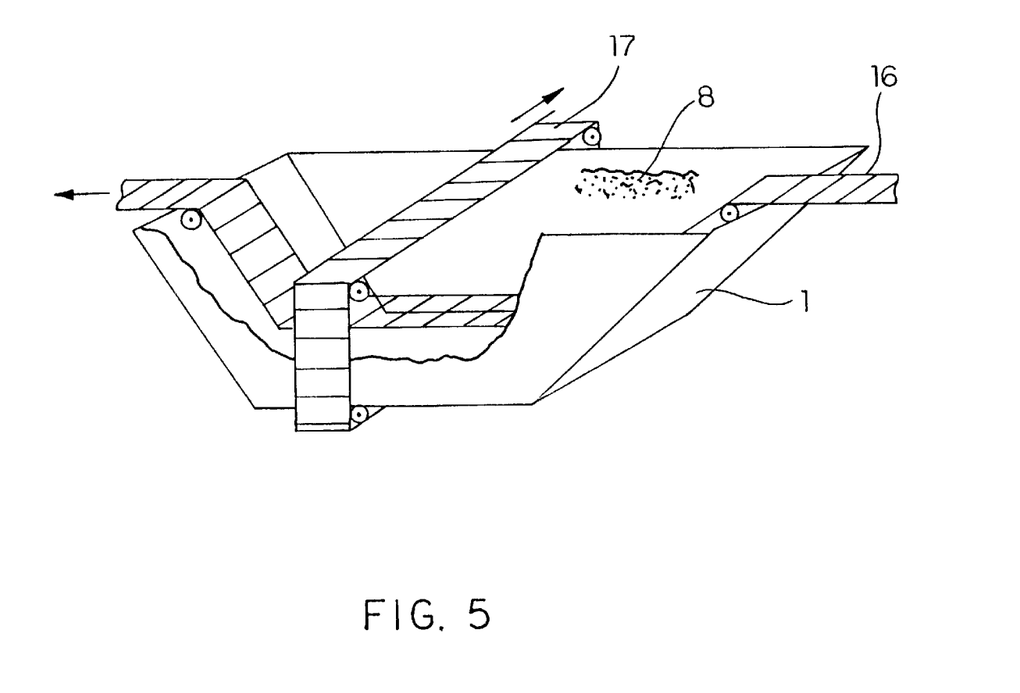
FIG. 5 A variant model of a separating appliance with conveyor belts for the separation of capacitors.

The separating vessel visible in FIG. 5 is filled with a magnetic fluid 8, not represented in its entirety in the drawing. Also not represented in the figure are the magnets producing the magnetic field gradients, which are placed on the outside of the separating vessel 1, as well as the drive assembly for the conveyor belts 16 and 17.

The capacitors to be separated are now brought into the separating vessel 1, whereby those containing PCB sink down into the magnetic fluid 8 on account of their high density, and the PCB-free capacitors float on the surface owing to their lower density. Pre-requisite for this is an exact setting of the magnetic parameter. Now the two mutually orthoganally placed conveyor belts 16 and 17 start work, which convey the separated capacitors out of the separating vessel 1 and place them at the ready for farther treatment in the separation process. Here the conveyor belt 16 is led along the inner wall of the separating vessel via the appropriate deviation mechanism from the separating vessel opening transporting the capacitors containing PCB out of the separating vessel 1. The conveyor belt 17, running orthoganally to the conveyor belt 16, also goes via the appropriate deviation mechanism and along the surface of the magnetic fluid 8. This outlet route along the conveyor belt 17 only allows the further transport of PCB capacitors. Through appropriate blocking mechanism, not shown in FIG. 1, it is ensured that no capacitors floating on the surface of the magnetic fluid 8 can gain access to the conveyor belt 16.

Underneath the outlet sides of the conveyor belts 16 and 17 are interceptors for intercepting the separated objects, whereby the interceptors and the conveyor belts 16 and 17 have preparations on their outsides conducive to magnetic precipitation and the rinsing off of the magnetic fluid adhering to the objects.

The manufacture of the environment-friendly diluted magneto-fluids is to be explained in more detail through examples.

As magnetic particles iron oxide is used, which for the most part consists of magnetite.

The manufacture of these particles takes place according to the following scheme;

$$Fe^{2+}+2Fe^{3+}+8OH^-\rightarrow Fe_3O_4+4H_2O$$

Alongside this, iron salt solutions, which can consist of iron chloride, —sulphate, —nitrate, are compounded with ammonium—, potassium—, sodium— or calcium-hydroxide solution. After the removal of the electrlytes through water washing the surfactants are adsorbed one after another at a temperature of 60–80° C.

EXAMPLE 1

Surfactants: Lauric Acid/Palmitic Acid // Alkylpolyglycoside $C_{12-14}$, DP 1, 4

1 mol iron (II) sulphate or iron (II) chloride solution are mixed with 1 mol iron (III) chloride solution in a ratio of 1:1.5–1.8, and compounded with so much KOH or NH3 solution, that the pH value is at least 10 at precipitation. Through washing with water the electrolyte is removed from the precipitated oxide mixture.

1.2 mMol lauric acid/palmitic acid (2:1) per 1 g magnetite is added, whereby the adsorption occurs at 80° C.

Afterwards it is washed again with H20 and the pH value is set at an optional value between 7 and 10. 1.2–1.5 mMol alkylpolyglycoside C12-14, DP 1.4, e.g. GLUCOPON 600 CS UP (Henkel), MALOSAN 240 (Hüls) per 1 g magnetite is added, whereby the adsorption takes place at 90° C. The resulting magneto-fluid is very viscous and is therefore thinned with H20. Saturation polarisation of up to 15 mT is attained at a viscosity of n=1.7 mPa s.

EXAMPLE 2

Surfactants: Oleic Acid//Alkylpolyglycoside C12-14, DP 1.4

Magnetite is produced according to example 1.

1.2 mMol oleic acid per 1 g magnetite is added, whereby the adsorption occurs at 90° C. Afterwards it is washed again with water and the pH value is set at an optional value between 7 and 10. 1.2–1.5 mMol alkylpolyglycoside C12-14, DP 1.3, e.g., GLUCOPON 600 CS UP (Henkel), MALOSAN 250 (Hüls) per 1 g magnetite is added, whereby the adsorption occurs at 90° C. The resulting magneto-fluid is very viscous and is thus thinned with H20. Saturation polarisation of up to 13 mT is attained, at a viscosity of n=1.7 mPa s.

EXAMPLE 3

Surfactants: Lauric Acid // Saccharosemonolorate

Magnetite is produced according to example 1.

1.2 mMol lauric acid per 1 g magnetite is added, whereby the adsorption occurs at 80°. Afterwards it is washed again with H20 and the pH value is set at about 7.1.2–1.5 mMol saccharosemonolaurate is adsorbed per 1 g magnetite in 20 min at 80° C.

Dependent on the thinning with H20, saturation polarisations of up to 22 mT at a viscosity of n=2.1 mPa s at 25° C. are attained.

The magneto fluids produced according to examples 1–3 are centrifuged for 90 min at 3000 g, to remove the unstable particles.

The stability, the solubility behaviour in water and the viscosity can be influenced in the preceding examples 1 to 3 by the addition of easily water-soluble poly-hydric alcohols adding in conclusion 0.007 Mol glucose per g iron oxide.

The manufacture of sugar surfactants is generally familiar. Primarily commercially available sugar surfactants are employed, which are used in the cosmetic or foodstuffs industries.

EXAMPLE 4

Surfactants: Lauric Acid/Myristic Acid//Ethoxylated Fatty Alcohol C12–14, E09

1 mol iron (II) sulphate or iron (III) chloride solution is mixed with 1 mol iron(II) chloride solution in a ratio of 1.5–1.8:1, and compounded with so much potassium hydroxide or ammoniac solution that the pH value lies at 10 after completed precipitation. Through washing with water the elctrolytes are removed from the precipitated magnetite. The process can be accelerated if the magnetic particles are fixated with a permanent magnet and the surrounding solution decanted off.

1.2 mMol lauric acid/myristic acid (2:1) per g magnetite is adsorbed within 20 min at 80° C.

Afterwards it is washed again with water and the pH value is set at an optional value between 5 and 14. 1.2–1.5 mMol, e.g. MARLIPAL 24/90 (Hüls), LAUROPAL 9 (Witco) per 1 g magnetite is adsorbed in 20 min at 80° C. After 10 minutes 0.05 g ethylene glycol per g magnetite is added. The very easily soluble magneto-fluid can be thinned at random. Saturation polarisations of up to 35 mT are attained. The viscosity at 20 mT amounts to about =3 mPa (25°).

EXAMPLE 5

Surfactants: Lauric Acid/Myristic Acid // Ethoxylated Fatty Alcohol C 12–14, E07 Butyl-sealed Ethoxylated Fatty Alcohol Mixture.

Magnetite is produced according to example 4.

1.2 mMol lauric acid/myristic acid (3:1) per g magnetite is adsorbed within 20 min at 80° C.

Afterwards it is washed again with water and the pH value is set at an optional value between 5 and 14. 1 mMol e.g. MARLIPAL 24/7=(Hüls) and 0.2–0.5 mMol DEHYPON LS 104 (Henkel) per 1 g magnetite are adsorbed in 20 min at 80° C. The very easily soluble magneto-fluid can be thinned at random. Saturation polarisations of up to 30 mT are attained. The viscosity at 20 mT amounts to about = 3 m Pa s (25° C.).

EXAMPLE 6

Surfactants: Myristic Acid/Oleic acid //Ethoxylated Fatty Alcohol C12–14, E09

Magnetite is produced according to example 4.

1.2 mMol myristic acid/oleic acid (3;1) per g magnetite is adsorbed within 20 min at 80° C.

Afterwards it is washed again with H20 and the pH value is set at an optional value between 5 and 14. 1 mMol, e,g,, MARLIPAL 24/90 (Hüls), LAUROPAL 9 (Witco) per 1 g magnetite is adsorbed in 20 min at 80° C. The very easily soluble magneto-fluid can be thinned at random. Saturation polarisations of up to 30 mT are attained. The viscosity at 20 mT amounts to about 3 mPa s (25° C.).

EXAMPLE 7

Surfactants: Lauric Acid/Myristic Acid//ethoxylated Fatty Alcohol, C12–14, E07

Magnetite is produced according to example 4.

1.2 mMol lauric acid/myristic acid (3:1) per g magnetite and 1.2 –1.5 mMol MARLAPAL 24/70 (Hüls) per g magnetite is adsorbed within 20 min at 80° C. Besides this the surfactant for the second layer is added 5 minutes later. Saturation polaristations of up to 30 mT are attained. The viscosity at 20 mT amounts, to About 3 mPa s (25° C.), the pH value lies above 7.5.

The magneto-fluids prooduced as in examples 4–7 are centrifuged for 90 min at 4000 g, in order to remove the unstable particles.

Apart from their use in separating non-magnetic materials, the magnetic fluids are also suitable as marking substances for analysing soil erosion, for hermetic sealing of rotary appliances and as standard substances in magnetic measuring instruments.

The invention is not limited to the examples described here. It is much more feasible to realise further examples through variations and combinations of the means and characteristics shown here, without forsaking the framework of the invention.

We claim:

1. A continuous system for separating non-magnetic materials of a selected density from non-magnetic materials of different densities, comprising:

a separator chamber containing a superparamagnetic fluid, means for conveying the non-magnetic materials into the separating chamber, means for applying a magnetic field of variable gradient to the fluid so as to create a density gradient within the fluid, whereby the materials of a selected density are directed toward an outlet means, means for removing separated materials from the chamber, means for recovering concentrated fluid adhering to the surface of a separated material after the removal of the separated material from the separator chamber, means for collecting said recovered concentrated fluid, means for monitoring the volume of fluid in the chamber and means for monitoring the magnetic concentration of the fluid in the chamber, means responsive thereto for automatically introducing fluid into the chamber so as to maintain a constant concentration and volume.

2. The system of claim 1, wherein the means for removal of the separated material comprises at least two conveyor belts running within the chamber such that the belts are at different levels from each other within at least a portion of the chamber.

3. The system of claim 2, wherein the removal means comprises two belts running orthogonal to each other, a first belt being positioned towards the bottom of the chamber for removing materials of higher density, and a second belt being positioned above the first belt for removing materials of lower density.

4. The system of claim 3, wherein the first belt runs along the bottom of the chamber, and the second belt runs along the surface of the fluid within the chamber.

5. The system of claim 1, wherein the means for recovering concentrated fluid comprises a magnetic means.

6. The system of claim 5, wherein the means for recovering concentrated fluid comprises a magnetic drum rotatable in the direction opposite to an outlet direction of the separated materials, and a collection chamber located below the drum for gravitationally collecting the recovered fluid.

7. The system of claim 5, further comprising means for rinsing the separated materials after recovery by magnetic means.

8. A continuous process for separating non-magnetic materials of a selected density from non-magnetic materials of different densities, comprising:
   conveying the non-magnetic materials into a separating chamber containing a superparamagnetic fluid,
   applying a magnetic field of variable gradient to the fluid so as to create a density gradient within the fluid,
   directing the materials of a selected density toward an outlet means by way of said density gradient,
   removing separated materials from the chamber,
   recovering concentrated fluid adhering to the surface of a separated material after the removal of the separated material from the separator chamber, and collecting said recovered concentrated fluid,
   monitoring the volume of fluid in the chamber and monitoring the magnetic concentration of the fluid in the chamber, and in response thereto, automatically introducing fluid into the chamber so as to maintain a constant concentration and volume.

9. The process of claim 8, wherein the fluid introduced into the chamber comprises the recovered concentrated fluid.

10. The process of claim 8, wherein the fluid introduced into the chamber comprises fresh superparamagnetic fluid.

11. The process of claim 8, wherein the separated material is removed by way of at least two conveyor belts running within the chamber and leading out of the chamber such that the belts are at different levels from each other within at least a portion of the chamber, and each of said belts collects and removes separated materials of a certain density directed to the belts by the varying magnetic gradient.

12. The process of claim 11, wherein the two belts run orthogonal to each other, a first belt being positioned towards the bottom of the chamber for removing materials of higher density, and a second belt being positioned above the first belt for removing materials of lower density.

13. The process of claim 12, wherein the first belt runs along the bottom of the chamber, and the second belt runs along the surface of the fluid within the chamber.

14. The process of claim 8, wherein the concentrated fluid is recovered by magnetic means.

15. The process of claim 14, wherein the step of recovering the concentrated fluid comprises contacting the separated material with a rotating magnetic drum, which drum is rotating in a direction against the movement of the separate material, and collecting the concentrated fluid which first adheres magnetically to the rotating drum, and then falls from the drum gravitationally.

16. The process of claim 15, wherein the recovering step further comprises, after contacting the separated material with the rotating drum, rinsing the separated material with water.

* * * * *